US012705248B2

(12) United States Patent
Grehant

(10) Patent No.: US 12,705,248 B2
(45) Date of Patent: Aug. 11, 2026

(54) METHOD FOR ALERTING OF AN EVENT AFFECTING A PHYSICAL SYSTEM

(71) Applicant: Dassault Systemes, Velizy Villacoublay (FR)

(72) Inventor: Xavier Grehant, Columbes (FR)

(73) Assignee: Dassault Systemes, Velizy Villacoublay (FR)

( * ) Notice: Subject to any disclaimer, the term of this patent is extended or adjusted under 35 U.S.C. 154(b) by 1070 days.

(21) Appl. No.: 16/232,650

(22) Filed: Dec. 26, 2018

(65) Prior Publication Data

US 2019/0197424 A1 Jun. 27, 2019

(30) Foreign Application Priority Data

Dec. 25, 2017 (EP) .................................... 17306934

(51) Int. Cl.
*G06F 16/00* (2019.01)
*G05B 23/00* (2006.01)
(Continued)

(52) U.S. Cl.
CPC ......... *G06F 16/2462* (2019.01); *G05B 23/00* (2013.01); *G06F 9/542* (2013.01);
(Continued)

(58) Field of Classification Search
None
See application file for complete search history.

(56) References Cited

U.S. PATENT DOCUMENTS 5,771,342 A * 6/1998 Todd ....................... G06T 17/00 345/660
7,853,599 B2 * 12/2010 Liu ....................... G06F 16/334 707/748

(Continued)

FOREIGN PATENT DOCUMENTS

JP 2009-237914 A 10/2009
JP 2017-107541 A 6/2017
WO WO 2017/157438 A1 9/2017

OTHER PUBLICATIONS

Amiri et al, “Learning Text Pair Similarity with Context-sensitive Autoencoders”, Proceedings of the 54th Annual Meeting of the Association for Computational Linguistics, pp. 1882-1892, Berlin, Germany, Aug. 7-12, 2016. 2016 Association for Computational Linguistics (Year: 2016).*

(Continued)

*Primary Examiner* — Viker A Lamardo
*Assistant Examiner* — Leah M Feitl
(74) *Attorney, Agent, or Firm* — Oblon, McClelland, Maier & Neustadt, L.L.P.

(57) ABSTRACT

A computer-implemented method for predicting new occurrences of an event of a physical system. The method includes providing a first set of past events of the physical system, each past event comprising several attributes, providing a signature for each past event of the first set, providing a new event comprising several attributes, computing a signature of the new event, computing a similarity measure between the signature of the new event and each signature of each past event of the first set, determining the past events closest to the new event according to the similarity measures thereby forming a second set of past events, computing a score of relevance for each attribute of the second set, (Continued)

providing a set of attributes by selecting the attributes having the greater scores of relevance.

13 Claims, 5 Drawing Sheets

(51) Int. Cl.
*G06F 9/54* (2006.01)
*G06F 16/2458* (2019.01)
*G06F 17/18* (2006.01)
*G06F 18/22* (2023.01)
*G06F 30/00* (2020.01)
*G06N 3/0455* (2023.01)
*G06N 3/088* (2023.01)
*G06N 7/01* (2023.01)
*G06N 20/00* (2019.01)
*G06F 111/08* (2020.01)

(52) U.S. Cl.
CPC .............. *G06F 16/00* (2019.01); *G06F 17/18* (2013.01); *G06F 18/22* (2023.01); *G06F 30/00* (2020.01); *G06N 3/0455* (2023.01); *G06N 3/088* (2013.01); *G06N 7/01* (2023.01); *G06N 20/00* (2019.01); *G06F 2111/08* (2020.01)

(56) References Cited

U.S. PATENT DOCUMENTS 8,307,374 B2* 11/2012 Rosenbluth ......... H04L 41/0631 714/39
2008/0062167 A1* 3/2008 Boggs ..................... G06T 19/00 345/419
2010/0082620 A1* 4/2010 Jennings, III .......... G06Q 10/10 707/736
2013/0204826 A1* 8/2013 Lee .......................... G06N 5/02 706/46
2014/0200930 A1* 7/2014 Zizzamia ............... G16H 50/50 705/4
2014/0208335 A1* 7/2014 Endrikhovski ......... G06F 9/542 719/318
2014/0330756 A1* 11/2014 Thapliyal ............... G06N 5/025 706/47
2016/0004980 A1* 1/2016 Goldschmidt ........... G06N 5/04 706/11
2016/0110669 A1* 4/2016 Iyer .................. G06Q 10/06315 705/7.25
2016/0275183 A1* 9/2016 Bufe ..................... G06F 16/335
2016/0371588 A1* 12/2016 Richardson ............ G06N 20/00
2017/0300554 A1* 10/2017 Ayik ...................... G06F 16/245
2018/0120813 A1* 5/2018 Coffman ................ G06N 20/00
2018/0255470 A1* 9/2018 Zhang ................... H04W 24/04
2019/0081851 A1* 3/2019 Farrell .................. H04L 41/065
2019/0197079 A1* 6/2019 Horesh ................... G06F 30/00
2019/0227504 A1* 7/2019 Ma ........................ G05B 13/042
2019/0318026 A1* 10/2019 Joseph .............. G06F 16/24553

OTHER PUBLICATIONS

Fred C et al, "autocad error codes", AutoCAD Customization Community, DOI: https://forums.autodesk.com/t5/vba/autocad-error-codes/td-p/1480478 (Year: 2005).*
Silberer et al, "Learning Grounded Meaning Representations with Autoencoders", Proceedings of the 52nd Annual Meeting of the Association for Computational Linguistics, pp. 721-732, Baltimore, Maryland, USA, Jun. 23-25, 2014 (Year: 2014).*
Huangfu et al, "A method of 3D CAD model retrieval based on spatial bag of words". Multimed Tools Appl 76, 8145-8173 (2017). https://doi.org/10.1007/s11042-016-3456-5 (Year: 2017).*
Tao et al, "Quantifying textual terms of items for similarity measurement", Information Sciences vols. 415-416, Nov. 2017, pp. 269-282 (Year: 2017).*
Wei et al, "Variable importance analysis: A comprehensive review", Reliability Engineering & System Safety, vol. 142, Oct. 2015, pp. 399-432 (Year: 2015).*
Unger, "Latent Context-Aware Recommender Systems", RecSys '15: Proceedings of the 9th ACM Conference on Recommender Systems, pp. 383-386, https://doi.org/10.1145/2792838.2796546 (Year: 2015).*
Extended European Search Report issued Dec. 6, 2018 for European Application No. 17306934.5.
Archer et al., "Empirical characterization of random forest variable importance measures," Computational Statistics & Data Analysis, vol. 52, Issue 4, Jan. 10, 2008, pp. 2249-2260, abstract only.
Sauerbrei et al., "Selection of important variables and determination of functional form for continuous predictors in multivariable model building," Statistics in Medicine, vol. 26, 2007, pp. 5512-5528.
Roweis et al., "Nonlinear dimensionality reduction by locally linear embedding," Science, New Series, vol. 290, No. 5500, Dec. 22, 2000, pp. 2323-2326.
Wold et al., "Principal Component Analysis," Chemometrics and Intelligent Laboratory Systems, vol. 2, 1987, pp. 37-52.
Bengio et al., "Representation Learning: A review and new perspectives," IEEE transactions on pattern analysis and machine intelligence 35.8, 2013, pp. 1798-1828.
Dai et al., "Document Embedding with Paragraph Vectors," arXiv preprint arXiv: 1507.07998 (2015).
Armiri et al., "Learning Text Pair Similarity with Context-sensitive Autoencoders," Proceedings of the 54$^{th}$ Annual Meeting of the Association for Computational Linguistics, vol. 1, 2016.
Fasano et al., "A multidimensional version of the Kolmogorov-Smirnov test," Monthly Notices of the Royal Astronomical Society, vol. 225, 1987, pp. 155-170.
Mukherjee et al., "Parisimonious use of indicators for evaluating sustainability systems with multivariate statisticals analyses," Clean Technologies and Environmental Policy, No. 15, No. 4, Apr. 16, 2016, pp. 699-706, XP055528708.
Guyon et al., "An Introduction to Variable and Feature Selection," Journal of Machine Learning Research 3, vol. 3, Mar. 2003, pp. 1157-1182, XP058112314.
Leeke et al., "Towards Understanding Importance of Variables in Dependent Software," Dependable Computing Conference, Apr. 28, 2010, Piscataway, New Jersey, USA, pp. 85-94, XP031682068.
Japanese Office Action issued on Jan. 17, 2023 in the Japanese Patent Office Action 2018-239489, 6 pages.
Kazuko Takahashi, et al., "An Automatic Occupation and Industry Coding System in Sociology", Natural Language. Processing, General Incorporated Foundation Language-Processing Society, vol. [24$^{th}$], No. 1, Feb. 15, 2017, pp. 135-170 (Japan with English Translation).
Japanese Office Action issued on May 9, 2023 in Japanese Patent Application No. 2018-239489 (with unedited computer-generated English translation), 5 pages.
Combined Chinese Office Action and Search Report issued Dec. 25, 2023, in corresponding Chinese Patent Application No. 201811587905.8 (with English Translation), 25 pages.
Office Action dated Aug. 15, 2024, issued in counterpart CN Application No. 201811587905.8 filed on Dec. 25, 2018, with English Translation, (29 pages).

* cited by examiner

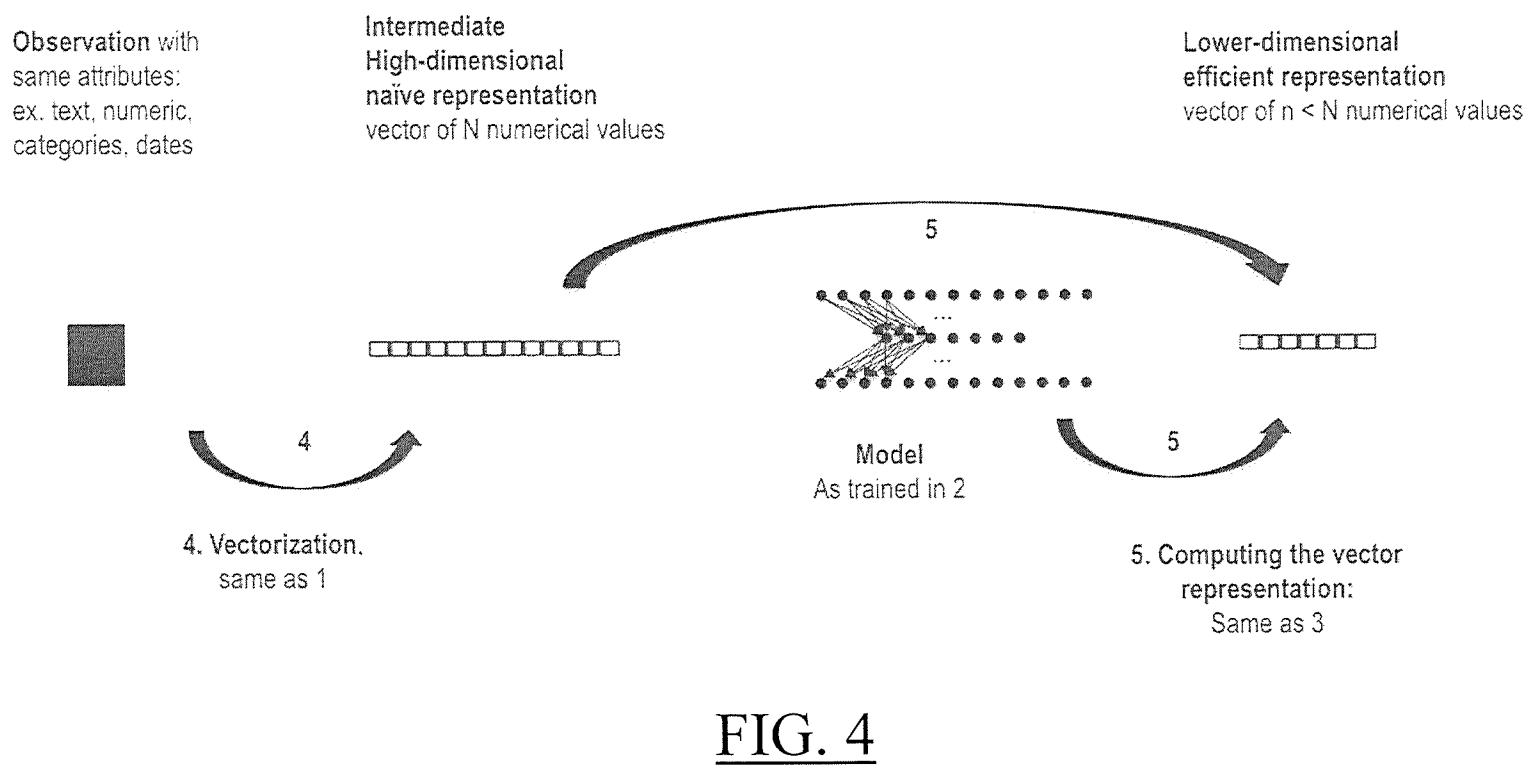

Observation with
same attributes:
ex. text, numeric,
categories, dates

4

4. Vectorization.
same as 1

Intermediate
High-dimensional
naïve representation
vector of N numerical values

5

Model
As trained in 2

5

Lower-dimensional
efficient representation
vector of n < N numerical values

5. Computing the vector
representation:
Same as 3

FIG. 4

METHOD FOR ALERTING OF AN EVENT AFFECTING A PHYSICAL SYSTEM

CROSS-REFERENCE TO RELATED APPLICATIONS

This application claims priority under 35 U.S.C. § 119 or 365 to European Application No. EP 17306934.5, filed Dec. 25, 2017. The entire contents of the above application(s) are incorporated herein by reference.

FIELD OF THE INVENTION

The invention relates to the field of computer programs and systems, and more specifically to a method, system and program for predicting new occurrences of an event of a physical system.

BACKGROUND

Predictions are used for decision making in engineering. They serve to identify possible causes and effects of events and plan efficient actions in response to the event. For instance, in an ongoing satellite launch, predicting incidents is needed to avoid new occurrences of incidents. Applications area include for instance helping to support maintenance of products and assets, in virtual all areas of the industry (automotive, aerospace, industrial equipment, etc). It also applies to return on experience for quality in design and manufacturing, e.g. a computer-aided design (CAD) system can provide recommendations for the design of a device so that the risk of malfunctioning of the designed device is minimized.

The problem of "variable importance" is concerned with finding variables whose knowledge is important to determine the value of a specific target variable, for example, finding the variables that are the most important to determine the cost of an event or the probability for an event to occur (cost and probability being the target variable). For instance, the duration of use of a cutting machine, the average strength of the material on it has been used to cut, and the average room temperature may be among the most important factors to determine the probability for the machine to break down. Basically, one can argue that the variables that best characterize observations are the variables that best determine the probability of the observations to occur, which is a variable, and therefore that the variable importance problem is more general than the problem of characterizing an observation. However, there are two problems with using variable importance in this way to characterize observations. First, it requires that for the probability to happen for each observation is known. Second, the variable importance returns the variables that best correlate with the probability of occurrence of an observation in general and not an observation in particular, i.e. it returns a set of variables that characterize the whole set of observations, not a set of variables that characterize an observation with regards to the others.

Identifying the variables that best characterize a particular event of a physical system such as a plant, e.g. the variable that best explain the differences between the normal functioning of the physical system event and a given failure of the physical system, is thus of importance. The values of these variables are likely to be among the causes of the event (if the data pre-exists the event) or among its effects (if the data was produced after the event occurred).

Within this context, there is still a need for an improved prediction of new occurrences of an event of a physical system.

SUMMARY OF THE INVENTION

It is therefore provided a computer-implemented method for predicting new occurrences of an event of a physical system. The method comprises providing a first set of past events of the physical system, each past event comprising several attributes, providing a signature for each past event of the first set, providing a new event comprising several attributes, computing a signature of the new event, computing a similarity measure between the signature of the new event and each signature of each past event of the first set, determining the past events closest to the new event according to the similarity measures thereby forming a second set of past events, computing a score of relevance for each attribute of the second set, providing a set of attributes by selecting the attributes having the greater scores of relevance.

The method may comprise one or more of the following:
- the attributes of the second set for which the scores of relevance are computed are present in both the first and second sets;
- the score of relevance of an attribute is computed by comparing distribution probabilities of its values on the second set with distribution probabilities of its values on the first set;
- providing a signature for each past event of the first set and for the new event comprises providing a numerical vector for each past event of the first set and for the new event;
- providing a signature comprises: training a machine learning model with a third set of past events, applying, on each past event of the first set and on the new event, the machine learning model;
- the trained model is a context sensitive auto-encoder;
- a similarity metric used for determining the past events closest to the new event is one among: cosine similarity, Euclidian distance, inverse Euclidian distance;
- an attribute comprises at least one structured attribute;
- an attribute further comprises at least one unstructured attribute;
- the score of relevance is computed with values of structured attributes only;
- after forming a second set of past events, computing at least one subset of past events of the second set; and wherein computing the score of relevance further comprises computing the score of relevance for each attribute of in the said at least one subset of past events of the second set;
- the past events of the first set and the new event are described by the same attributes;
- the new event and the signature of the new event are stored with the past events and the signatures of the past events thereby becoming a past event.

It is further provided a computer program comprising instructions for performing the method.

It is further provided a computer readable storage medium having recorded thereon the computer program.

It is further provided a system comprising a processor coupled to a memory, the memory having recorded thereon the computer program.

BRIEF DESCRIPTION OF THE DRAWINGS

Embodiments of the invention will now be described, by way of non-limiting example, and in reference to the accompanying drawings, where:

FIGS. 2, 3, 4 and 5 illustrate an example of the method; and

DETAILED DESCRIPTION OF THE INVENTION

Figure 1:
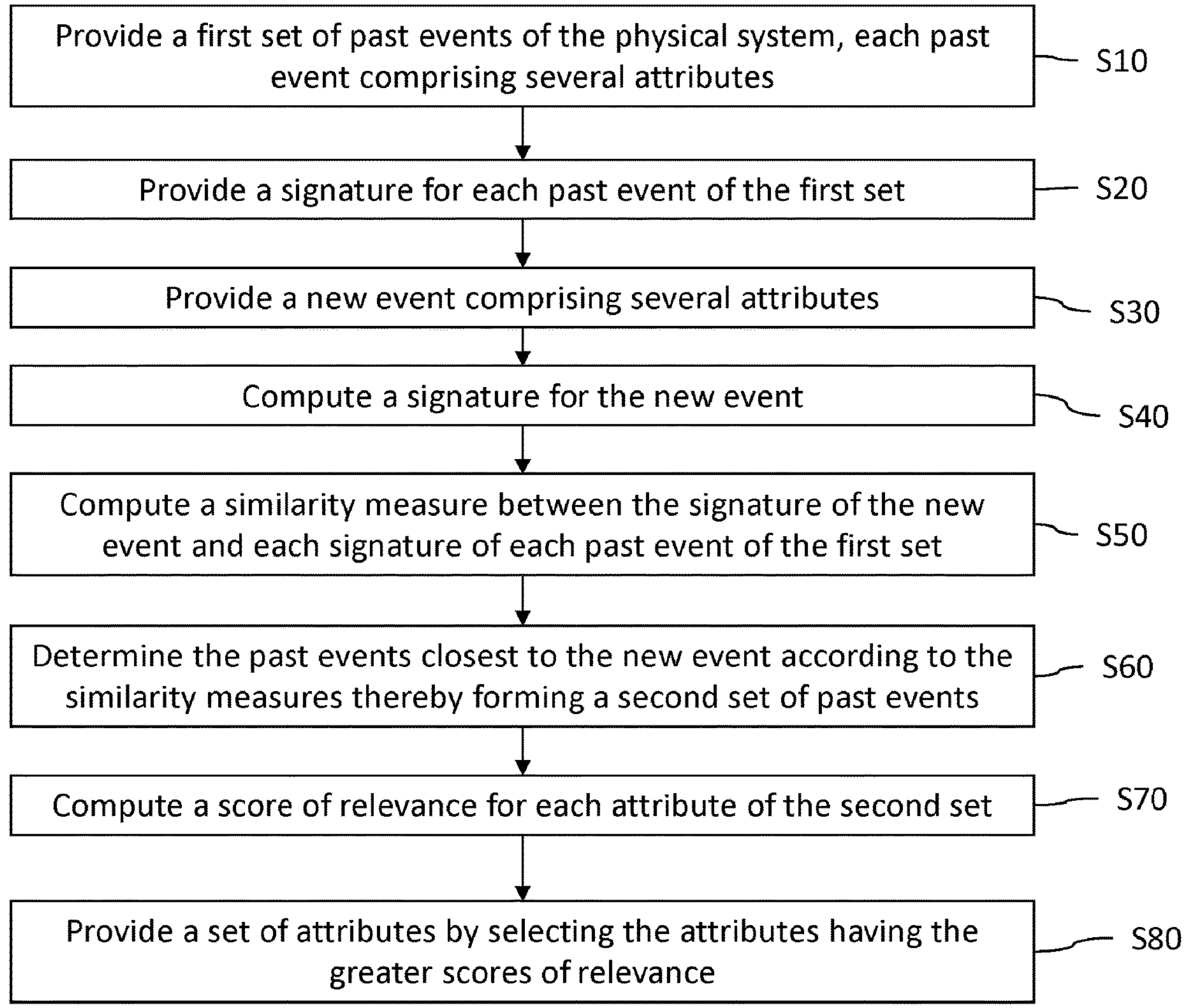
FIG. 1 shows a flowchart of an example of the method.

With reference to the flowchart of FIG. 1, it is proposed a computer-implemented method for predicting new occurrences of an event of a physical system. A physical system is typically a device or constructed tool. The method comprises providing a first set of past events of the physical system. Each past event comprises several attributes. The method also comprises providing a signature for each past event of the first set. Then, a new event comprising several attributes is provided. A similarity measure is computed between the signature of the new event and each signature of each past event of the first set. The method also comprises determining one or more past events that are the closest to the new event according to the similarity measures; these one or more past events thereby form a second set of past events. The method further comprises computing a score of relevance for each attribute of the second set, and providing a set of attributes by selecting the attributes having the greater scores of relevance.

Such method improves the prediction of new occurrences of an event in a physical system. Indeed, the method uses a collection of observations similar to the one to be characterized, and these multiple observations allow to carry out statistical analyses of attributes. Then a probability distribution of the attributes available to describe the similar observations to the probability distribution of the same attributes on a larger set of observations, is computed. To do this, for each attribute, a similarity or divergence measure is used between empirical distributions. The similarity or divergence measure is computed with the score of relevance. The similarity or divergence measure is calculated on the values of the attribute for each of the set of similar observations and the larger set. The similarity or divergence is then used to score the importance of the attribute. Hence, the invention provides a characterization of individual events as opposed to variable importance techniques and dimension reduction techniques, that provide a characterization of a group of observations, typically all available observations. The characterization provided by the invention is related to the causes and effects of the event in the sense that the attributes selected according to the invention are likely to exhibit values that contain elements at the origin or consequences of the event. For instance, this is not true for dimension reduction techniques, that do not aim at identifying the causes and effects of a particular event: indeed, dimensionality reduction techniques reduce the size of the data while retaining some information contained in the data, but the dimensions retained by dimensionality reduction techniques may be complex combinations of input variables, and may not allow to easily trace back the role of each input variable; besides, preserving variance or neighborhoods or distances does not guarantee that the retained dimensions will characterize a specific observation. Variable importance calculation techniques may be used in a certain way so as to identify variables correlated with the occurrence of the event and good candidates for exhibiting causes or effects of the event. This can be done for example by calculating the importance of the variables in the task of predicting whether a certain group of events will occur or not. But these techniques require knowing the probability of occurrence of each event, supervised training of a classification or regression task, and in particular grouping events into classes a priori and therefore limiting the analysis to previously defined groups of events, which are not a requirement of the present invention. The characterization provided by the invention is a simple, readable identification of individual attributes among those available to describe the observations, as opposed to dimension reduction techniques, that typically build dimensions by combining attributes.

The method is computer-implemented. This means that steps (or substantially all the steps) of the method are executed by at least one computer, or any system alike. Thus, steps of the method are performed by the computer, possibly fully automatically, or, semi-automatically. In examples, the triggering of at least some of the steps of the method may be performed through user-computer interaction. The level of user-computer interaction required may depend on the level of automatism foreseen and put in balance with the need to implement user's wishes. In examples, this level may be user-defined and/or pre-defined.

For instance, the steps of providing an event, a set of events may be performed upon user action, where the user selects events among a list of events, or inputs the events.

A typical example of computer-implementation of a method is to perform the method with a system adapted for this purpose. The system may comprise a processor coupled to a memory and a graphical user interface (GUI), the memory having recorded thereon a computer program comprising instructions for performing the method. The memory may also store a database. The memory is any hardware adapted for such storage, possibly comprising several physical distinct parts (e.g. one for the program, and possibly one for the database).

The method generally manipulates event of a physical system. A physical system is typically a device that allows or contributes to the manufacturing of a product of the real world. A physical system can be any device in various and unlimited industrial fields, including, but not limited to: aerospace, architecture, construction, consumer goods, high-tech devices, industrial equipment, transportation, marine, and/or offshore oil/gas production or transportation. A physical system may thus be industrial product or device which may be any mechanical part, such as a part of a terrestrial vehicle (including e.g. car and light truck equipment, racing cars, motorcycles, truck and motor equipment, trucks and buses, trains), a part of an aerial vehicle (including e.g. airframe equipment, aerospace equipment, propulsion equipment, defense products, airline equipment, space equipment), a part of a naval vehicle (including e.g. navy equipment, commercial ships, offshore equipment, yachts and workboats, marine equipment), a general mechanical part (including e.g. industrial manufacturing machinery, heavy mobile machinery or equipment, installed equipment, industrial equipment product, fabricated metal product, tire manufacturing product), an electro-mechanical or electronic part (including e.g. consumer electronics, security and/or control and/or instrumentation products, computing and communication equipment, semiconductors, medical devices and equipment), a consumer good (including e.g. furniture, home and garden products, leisure goods, fashion products, hard goods retailers' products, soft goods retailers' products), a packaging (including e.g. food and beverage and tobacco, beauty and personal care, household product packaging).

Figure 2:
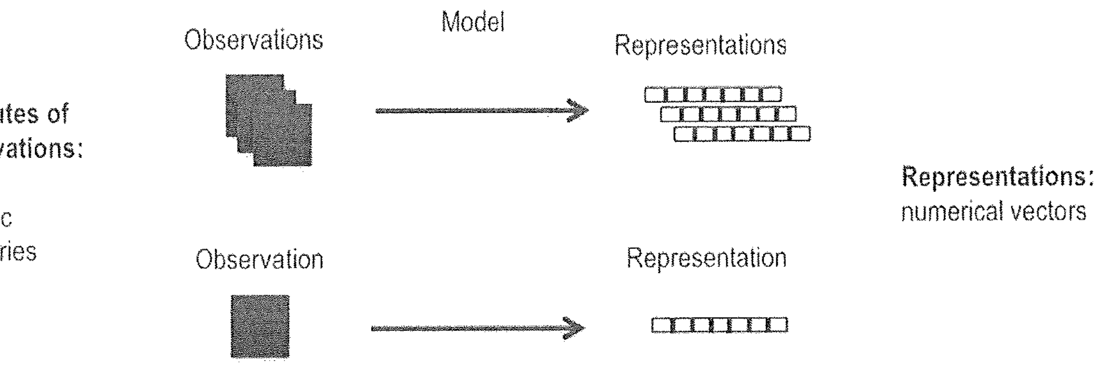

FIG. 2 shows an example of the system, wherein the system is a client computer system, e.g. a workstation of a user.

The client computer of the example comprises a central processing unit (CPU) 1010 connected to an internal communication BUS 1000, a random access memory (RAM) 1070 also connected to the BUS. The client computer is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The client computer may also include a haptic device 1090 such as cursor control device, a keyboard or the like. A cursor control device is used in the client computer to permit the user to selectively position a cursor at any desired location on display 1080. In addition, the cursor control device allows the user to select various commands, and input control signals. The cursor control device includes a number of signal generation devices for input control signals to system. Typically, a cursor control device may be a mouse, the button of the mouse being used to generate the signals. Alternatively or additionally, the client computer system may comprise a sensitive pad, and/or a sensitive screen.

The computer program may comprise instructions executable by a computer, the instructions comprising means for causing the above system to perform the method. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the system results in any case in instructions for performing the method.

Referring back to FIG. 1, at step S10, a first set of past events of the physical system is provided. An event can be also referred to as an observation. An event (or observation) is a set of attributes; an event might comprise one attribute only. In practice, an event comprises several attributes. An attribute is a symbol that is associated with a data. The symbol characterizes a parameter of the physical system. For instance, the physical system is a plant and the attributes a temperature, a pressure, a distance, a location in the plant. The data associated with the attributes may be provided by probes scattered in the plant, e.g. the probes provide values of measures as data of the variables. The events of the set preferably have at the same attributes.

The attributes may be structured attributes. Structured attributes are attributes associated with structured data, which is data represented or stored with a predetermined format. Structured data comprise, but are not limited to, numbers, categories (that is, a value taken from a finite list of values, dates, time of day, . . . ).

The attributes may be unstructured. Unstructured attributes are attributes associated with unstructured data, which is data represented or stored without a predetermined format. Unstructured attribute comprises, but is not limited to, plain text.

Next, at step S20, a signature is provided for each past event comprised in the first set. The signature of an event signature is a particular representation of the event that allows to characterize the event among the other event. Each signature may be unique, or not; typically, each signature of an event is unique as an event is generally unique at least because an event is dated and time stamped.

Interestingly, the present invention may apply to observations that are undated events. Multiple observations may refer to the same event. In the case of event analysis, the invention serves to find the probable causes and effects of the event. Probable causes are found in the characteristic attributes that predate the event, and probable effects are found in the characteristic attributes that follow the event. For undated events, characteristic variables would also be probable causes or effects of the event being as it is.

The provided signature of an event may be computed (that is, provided) from all the attributes associated with the event, or from a set of these attributes.

In examples, the signature of an event is described with a number of attributes with potentially different types such as text, numeric, categories, dates, . . . As the attributes of the observations known in the beginning are not always numerical, they can be first converted into a new set of attributes that only takes numerical values. Each event is transformed into a set of numerical value. In practice, the signatures may be numerical vectors.

The signature of an event may be represented with numerical vectors, as illustrated on FIG. 2. The same model applies for all the events used in the present method, e.g. for the first set of events, for the event that will be analyzed at a latter step of the method. . . . The vectorization or computation of the signature for event transforms the raw data of each event into an intermediate high-dimensional naïve representation vector of N numerical values per event, where N is a positive integer. For the sake of clarity, vectorization may not be not all of the computation of the signature. It may be a first step that provides a naïve signature; the naïve signature can then be improved by applying for instance a reduction dimension technique, which gives the signature In a first example, the vectorization converts an attribute that takes the form of free text, such as the description of an incident by a specialist, to a (potentially large) number of numerical attributes. For instance, each attribute may correspond to the number of occurrence of a particular word in the text. In an example, TF-IDF (term frequency-inverse document frequency)-based methods involve calculating the ratio of the number of occurrences of the word in the text, and the number of observations in which the word appears in the same attribute.

In a second example, an attribute that takes categorial values, such as for instance a car manufacturer or model, can be converted in as many Boolean attributes as there are possible values for the initial attributes. The Boolean values "True" and "False" are then converted into 1 or 0 (or vice versa) to obtain numerical values. Alternatively, a hashing method can be used, such as the Hashing Vectorizer provided by Scikit Learn. In a third example, numerical attributes can be left unmodified. In this third example, a valid question may be how to represent the absence of data on a numerical attribute as a number. Among multiple solutions, one consists in inputting data following one of the known techniques for that process, and adding a categorical variable that says whether the data was available or not for this attribute. It is to be understood that theses first, second and third examples can be combined.

When the signature of an event is represented with numerical vectors, the representation may not be used directly to compare events because the signature can introduce bias. Firstly, when a piece of information is implicitly conveyed with multiple dimensions of the naïve representation, it will be given more importance than other pieces of information that are not duplicated across attributes, when measuring the similarity between observations. For example, if one attribute is the outside air temperature and another is the GPS coordinates, and observations occur at every latitude, then there is some duplication of information related to the temperature, as high latitudes are correlated with low temperatures. This is not desirable, as those dimensions directly result from the choice of initial attributes, which can be arbitrary. For instance, one might want, for whatever reason, to duplicate an attribute, this should not affect the comparison between the observations. Secondly, when the values on two dimensions have different segments of definition, it will affect their importance in the similarity. The dimension with higher variance will be given more importance than the one with smaller variance. This is not desirable because the variance of the initial attributes is arbitrary. The choice of unit, for instance, is arbitrary. Choosing meters instead of kilometers as the unit for a given attribute should not affect the comparison between observations.

The naive representation (the intermediate high-dimensional naïve representation vector of N numerical values per event) is converted into representations that alleviate bias introduced by the numeric signature—arbitrary choice of input variables to describe the events—. In example, providing a signature of an event may further comprise training a machine learning model with a third set of past events. The machine learning model may be trained on a different set of events. In examples, the machine learning model is trained on a set A of events, and the model is then applied on a set B of events, and later the events of set B are compared to a new event. The set A of events can be equal to the set B of events, but the set A of events can also be different from the set B. Both the sets A and B are sets of past events. In examples, the model is trained every six months on all past events, and applied to all new incoming event every day. For instance, the model is trained on January $1^{st}$ and June $1^{st}$ every year; thus, on February $15^{th}$, the set A of events comprises all past events until January $1^{st}$, and the set B of events comprises all past events until February $15^{th}$. The set A is comprised in the set B, but the contrary is not true. The sets A and B differ. In an example, the first set and the third set are the identical.

Deep learning provides some interesting options to implement this step. For instance, the trained model is a context sensitive auto-encoder (or stacked context sensitive auto-encoders) that are a class of neural networks, and neural networks are a class of machine learning model. Auto-encoders or stacked auto-encoders are made of multiple layers of artificial neurons, one central layer being typically smaller in size than the input layer, and the last layer having the same size than the first. The neural network is trained to reproduce the input, and the output of the central layer is used as the representation of the input. Thus, the representation of the input is a compression of the input (that is, the middle layer has a smaller size than the input and output layers) that contains as much as possible of the information necessary to reproduce the input. In order for the neural network to perform well for a small representation, it will tend to distribute the relevant information in the representation in a way that is optimal to reconstruct the input. The optimal representation will be found for the dimension that minimizes the loss function (a function of the difference between the output and the input). This optimal representation should provide a representation as unbiased as a state-of-the art network topology permits.

After the neural network is trained, the events are run through the first layers of the network again (without changing the network that is trained) to obtain their representations (at the output of the middle layer). The machine learning model is applied on the set of past events, e.g. the first set of past events.

When events of a set of events comprise textual data, the numerical vector provided as input of the model is constituted with the number of occurrences in the text of each word of a vocabulary. The vocabulary may be obtained by a selection of the words of a set of texts. The selection can be based on TF-IDF of the words in those texts; for instance, the vocabulary is the set of words of highest average TF-IDF in those texts. Alternatively, the textual data related to each event is obtained with doc2vec or a similar document embedding technique.

In examples, a neural network is used to produce the signature of the events based on data related to the events. The neural network may be a deep neural network. As discussed, the neural network may be a context sensitive auto-encoder. The neural network may be a stacked context-sensitive auto-encoder. A context sensitive auto-encoder is simple, and its training and execution are faster than those of a deep neural network. In addition, a context sensitive auto-encoder has a lower memory print compared to stacked context-sensitive auto-encoder.

However, the latter better captures information. When the neural network is a context sensitive auto-encoder or a stacked context-sensitive auto-encoder, both take data originating from non-textual variables as context, which is differently treated from the rest of the input. In fact, one has a better understanding of the roles of the context and other data, and the context can also be derived from unstructured data, from the moment they are vectorized beforehand. The main data contains information to be represented, and the context contains contextual information with which the main data may be interpreted. For example, the main data can come from free text describing an event, and the context data can come from associated structured data.

Figure 3:
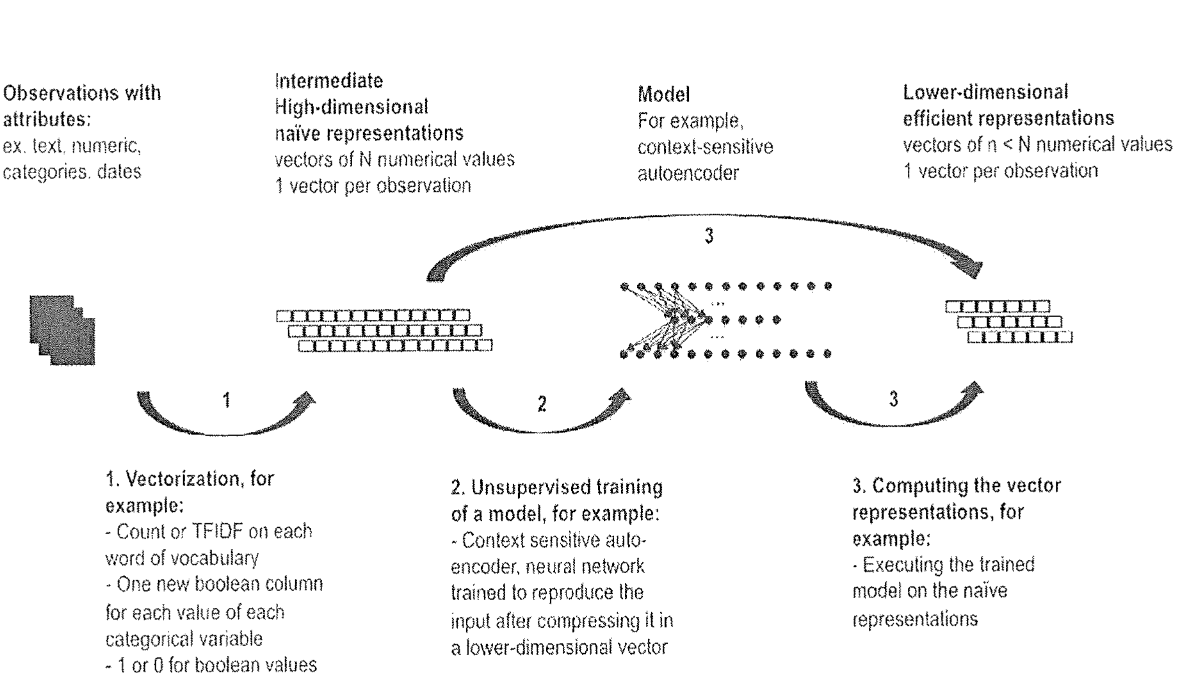

FIG. 3 illustrates an example of the computation of signatures for the first set of past events. An event is transformed into a naïve representation of dimension N, which in turn is provided in input of trained model and transformed into a lower-dimensional representation of dimension $n<N$.

Back to FIG. 1, at step S30, a new event comprising several attributes is provided. This event comprises one or more attributes, and at least one attribute is similar to those of the events of the first set. In practice, the new event has the same attributes as the events of the first set, that is, the new event and the past events of the first set are described by the same attributes.

Next, at step S40, a signature of the new event is computed. The signature is computed as discussed in reference to step S20.

Figure 5:
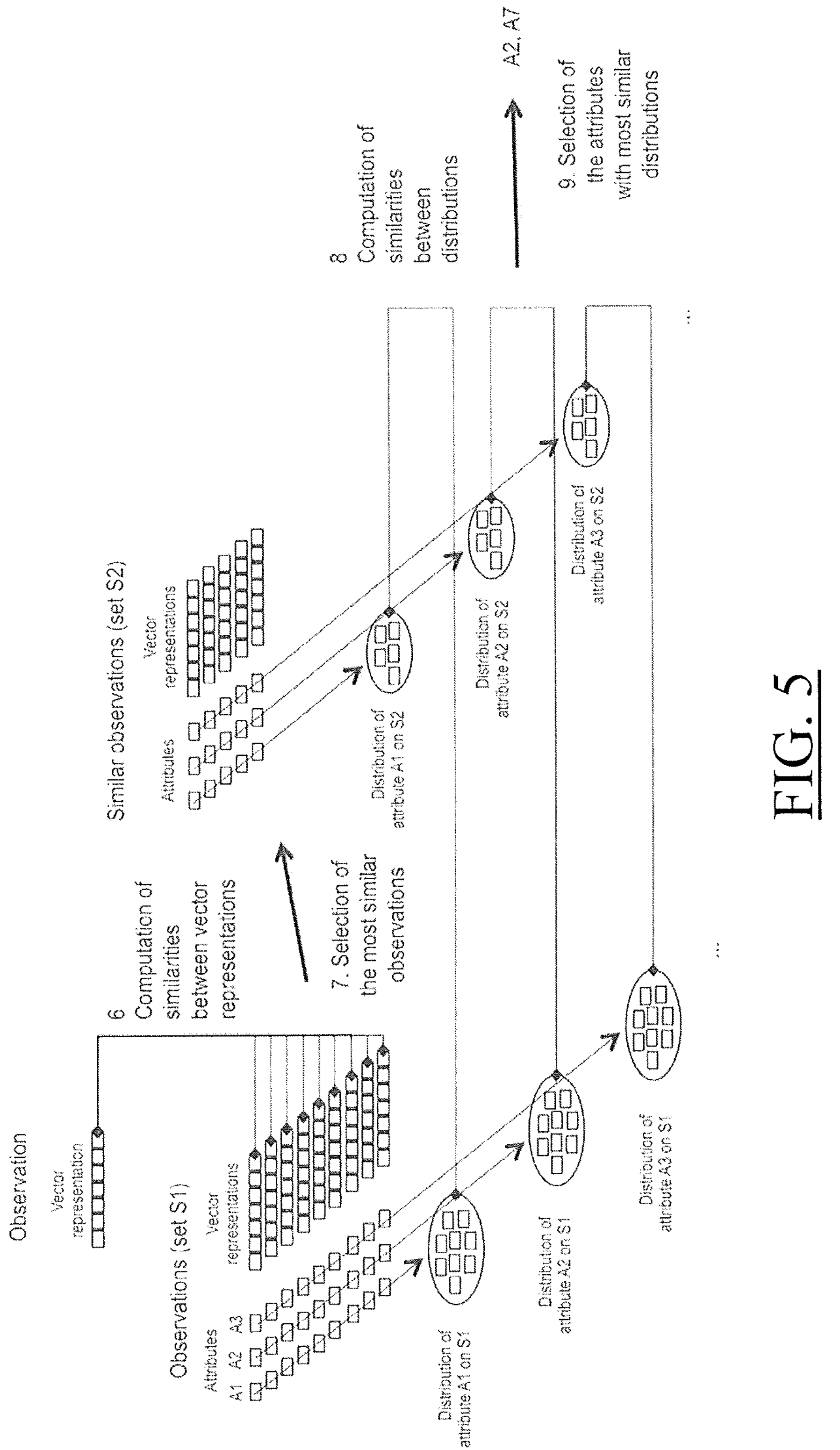
Figure 6:
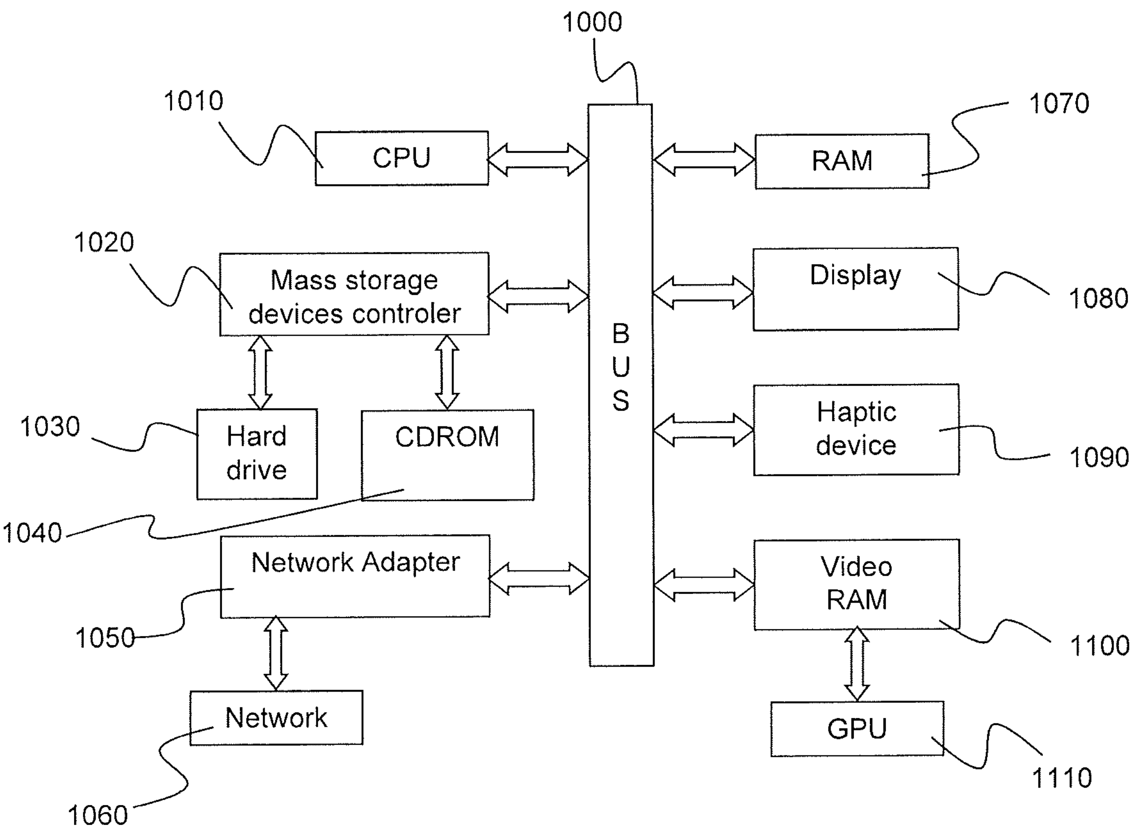
FIG. 6 shows an example of a system for performing the method.

FIG. 5 shows how a new observation to be analyzed is run through the same steps of the past events, as illustrated on FIG. 3 and discussed in reference with step S20. The new event is first vectorized, that is, it is converted into a first numerical vector, and then the first numerical vector is run through the trained model to provide the final representation.

The new event and the signature of the new event may be stored with the past events and the signatures of the past events thereby becoming a past event. This improves the consistency the events used for identifying relevant variable of an event.

Then, at step S50, a similarity measure is computed between the signature of the new event and each signature of each past event of the first set. The vectors produced at step S20 and S30 can be compared two by two using similarity metrics. It is to be understood that dissimilarity metrics may be used. The similarity or dissimilarity metric used may be, but is not limited to, cosine similarity, Euclidian distance, inverse Euclidian distance. . . . A good vector representation is a vector representation where similar events have similar vector representations. A good vector representation of events will verify that the vector of an event A is more similar to the vector of an event B which is a different occurrence of the same event than to an event C which is a different event. It will also be more similar to the vector of an event D than the vector of an event E, if A, D, and E are occurrences of different events, and D is more similar to A than E.

Once all the similarity measures of all the combinations between the signature of the new event and the events of the first have been computed, a second set of past events is computed (S60) that comprises the past events of the first set that have been determined as being the closest past events to the new one. By closest past events, it is to be understood that a ranking of the events of the first set is created based on the similarity (or dissimilarity) measure that is associated with each event, and a number of events with the highest ranking (for example with the highest similarity measures) are selected for forming the second set of events. The second set is thus formed with the most similar events with the new event provided at step S30.

The number of events of the first set that are selected to form the second set may be selected by the user, or automatically selected, or predefined. When selected by the user, he/she may define a threshold of similarity, where only the events with a similarity value higher that the threshold value will form the second set of events. Alternatively, the user may define a number of events with highest similarity values that will form the second set of events. Interestingly, this allows the user to customize the results that may be displayed by the present invention, e.g. the identified attributes that best characterize a particular event of a physical system. The number of events forming the second set may be automatically customized; the threshold is increased for each repetition of the step S60s to S80, and the threshold value for which the number of identified attributes that best characterize a particular event is the highest will be kept as threshold value for the next repetitions of the method.

Then, at step S70, a score of relevance is computed for each attribute of the second set. The score of relevance is a measure of the influence (or importance) of an attribute in the characterization of a particular event.

The score of relevance of each attribute may be computed by computing a separation between a distribution of values of each attribute in the second set and a distribution of values of each attribute in the first set. The computation of the separation aims at providing a difference between the events similar to the provided new event and the events not similar to the provided new event. To this aim, the score of relevance of an attribute is computed by comparing distribution probabilities of its values on the second set with distribution probabilities of its values on the first set. If a difference of distribution for an attribute is obtained as a result of the comparison, then the attribute is relevant; on the contrary, if no difference of distribution is obtained as a result of the comparison, then the attribute is not relevant for the provided new event.

Preferably, the attributes of the second set for which the scores of relevance are computed are present in both the first and second sets. This is for instance the case when all the events of the first set have the same attributes, as previously discussed. This ensures that a meaningful score of relevance can be computed for each attribute of each event of the second set. The identification of the relevant attributes in the characterization of the new event is thus improved, thereby improving the prediction of new occurrences of the new invent of the concerned physical system.

The score of relevance can be computed for all the attributes of the new event, or for only certain type of attribute. In examples, the score of relevance is computed for structured attributes only. Using structured attributes only allows to make a summary of these attributes, for example in the form of statistical analysis of their distribution (histogram, average, std, etc.).

In examples, Ie second set of past events may be subdivided into subsets of pasts events. The subdivision of the second set may be based on the similarity of one or more attributes. For instance, the events with attributes having the same values of score of relevance or close values (for instance values that belongs to a given range of values) will form a subset of past events of the second set. Thus, after the second set of past event being formed, at least one subset of past events of the second set is formed (or computed). It is to be understood that in the case one subset is formed, the remaining past events (those that do not belong to the one subset) implicitly form another subset of past events of the second set. Such subdivision of the second set improve the selection of the one or more attributes that characterize the Then, a set of attributes is provided (that is, identified) by selecting the attributes having the greatest scores of relevance. These one or more most relevant attributes are those that best characterize the new event of step S30. Interestingly, it is now possible to make a query by key word or introduce a constraint on a attribute, leading to restrict the first and the second set, which can lead to modify the score of relevance of the attributes.

FIG. 5 shows an example of the method. In this example, observations are used instead of events. Observations are undated events, as already explained. The vector representations of the observations (S20) are used to retrieve observations similar to the one submitted to the system (S10), that for each initial attribute of the observations, values are grouped to describe the probability distributions before and after filtering the similar observations, that the comparison of the so described probability distributions are used to measure the relevance of each attribute, and that this measure is used to decide whether or not to select the attribute as characteristic of the observation given in the input.

The vector representations are compared using a similarity metric (S50), for instance cosine similarity. Only the observations with the most similar vector representations (S60) to the one submitted in input (S30) of the system are kept. A similarity threshold can be set, or a max number of results, or both (560). A summary of the results can be shown to help adjust the threshold or max number of results. In this example, S1 is the set of observations before retrieval of the most similar observations, and S2 is the set of past events formed from the set S1. The observations of S2 are comprised in S1.

The attributes initially available to describe the events of S1 and S2 are collected. They are not the values found in the naïve or final vector representations as the meaning of these values is typically not intuitive. These are the attributes and their values found in the input of the system because they typically make sense to the user.

These attributes may or may not be of numerical type. Attributes of any type can be used at this point provided that there is a way to compare probability distributions of variables of their types.

For example, for numerical variables, the two-sample Kolmogorov Smirnov test provides a similarity measure between the empirical distributions. Here, the distributions are called empirical because they are defined by a sampling of their values rather than by the parameters of a theoretical model of their probability distribution. It consists in measuring the integral of the absolute difference between the probability density functions, or the sum of the absolute difference between the probabilities on each discrete value). The Kolmogorov Smirnov test actually provides a divergence rather than a similarity. Any strictly decreasing function of that can be used as a similarity. The attributes with the most similar (or least dissimilar) distributions on S1 and S2 are kept.

In an example, the method allows designing of a model of physical system on a Computer-Aided Design (CAD) system. First, a model of a physical system is provided. The physical system is associated with a first set of past events, each past event comprising several attributes. Then, for each past event of the first set, a set of attributes is provided, where the attribute are selected among the attributes of the past events. This is performed as discussed in reference with FIG. 1. Then, the said each past event is provided as a new event. A selection is performed, upon user action, of an attribute of the provided model of the physical system. As a result of the selection, the computerized system executing or running the invention determines whether the selected attribute belongs to the set of attributes, and if the selected attribute belongs to the set of attributes, triggers an alert to the user. The design on a CAD system of a physical system to be manufactured is thus improved. For the sake of explanation, CAD systems are now discussed.

By CAD system, it is meant any system adapted at least for designing a modeled object on the basis of a graphical representation of the modeled object, such as CATIA. In this case, the data defining a modeled object comprise data allowing the representation of the modeled object. A CAD system may for example provide a representation of CAD modeled objects using edges or lines, in certain cases with faces or surfaces. Lines, edges, or surfaces may be represented in various manners, e.g. non-uniform rational B-splines (NURBS). Specifically, a CAD file contains specifications, from which geometry may be generated, which in turn allows for a representation to be generated. Specifications of a modeled object may be stored in a single CAD file or multiple ones. The typical size of a file representing a modeled object in a CAD system is in the range of one Megabyte per part. And a modeled object may typically be an assembly of thousands of parts.

In the context of CAD, a modeled object may typically be a 3D modeled object, e.g. representing a product such as a part or an assembly of parts, or possibly an assembly of products. By "3D modeled object", it is meant any object which is modeled by data allowing its 3D representation. A 3D representation allows the viewing of the part from all angles. For example, a 3D modeled object, when 3D represented, may be handled and turned around any of its axes, or around any axis in the screen on which the representation is displayed. This notably excludes 2D icons, which are not 3D modeled. The display of a 3D representation facilitates design (i.e. increases the speed at which designers statistically accomplish their task). This speeds up the manufacturing process in the industry, as the design of the products is part of the manufacturing process.

The 3D modeled object may represent the geometry of a product to be manufactured in the real world subsequent to the completion of its virtual design with for instance a CAD software solution or CAD system, such as a (e.g. mechanical) part or assembly of parts (or equivalently an assembly of parts, as the assembly of parts may be seen as a part itself from the point of view of the method, or the method may be applied independently to each part of the assembly), or more generally any rigid body assembly (e.g. a mobile mechanism). A CAD software solution allows the design of products in various and unlimited industrial fields, including: aerospace, architecture, construction, consumer goods, high-tech devices, industrial equipment, transportation, marine, and/or offshore oil/gas production or transportation. The 3D modeled object designed by the method may thus represent an industrial product which may be any mechanical part, such as a part of a terrestrial vehicle (including e.g. car and light truck equipment, racing cars, motorcycles, truck and motor equipment, trucks and buses, trains), a part of an aerial vehicle (including e.g. airframe equipment, aerospace equipment, propulsion equipment, defense products, airline equipment, space equipment), a part of a naval vehicle (including e.g. navy equipment, commercial ships, offshore equipment, yachts and workboats, marine equipment), a general mechanical part (including e.g. industrial manufacturing machinery, heavy mobile machinery or equipment, installed equipment, industrial equipment product, fabricated metal product, tire manufacturing product), an electro-mechanical or electronic part (including e.g. consumer electronics, security and/or control and/or instrumentation products, computing and communication equipment, semiconductors, medical devices and equipment), a consumer good (including e.g. furniture, home and garden products, leisure goods, fashion products, hard goods retailers' products, soft goods retailers' products), a packaging (including e.g. food and beverage and tobacco, beauty and personal care, household product packaging).

When designing a model of physical system, the choices made in design have an influence on the defects in the lifetime of the product. For instance, the choice of material of a part may change the property of the part in the long term and the conditions in which the part may behave improperly. The invention can be used when investigating a particular incident, to identify such design choices that are correlated with occurrences of the incident. Upon identification of such relevant design choices, a notice (e.g. on a product lifecycle management system) can be circulated to prevent such choices to happen again in future versions of the product or immediately. Such notice may be automated in the computer-aided-design application. For instance, a new task may be automatically added to a to-do list in the computer-aided design software. A click on the task may switch the context of the computer-aided design software to allow the designer to make the relevant changes. The identification of the number of past incidents that occurred in similar cases (e.g. to products that share similar characteristics) can reveal the value of the variable that minimizes the chances for an incident to occur. For example, comparing the ratio of defective products when material A, B or C was chosen will help choose between the three options. Alerts can be automatically triggered in the design application for each variable identified according to the invention as characteristic of a substantial number of incidents, or particularly serious incidents. Thus, alert can be provided before the designer selects a value for that variable, to notify them that the decision they're about to take is critical, and allow them to check the effect it had on products in the past, or after the designer selects a value for that variable, to notify them that the decision they have taken is likely to cause incidents in the future, because it did cause incidents in past similar cases (products that have similar other characteristics, and for which the same value was chosen). Thus, the invention reduces and overhead necessary on development and on execution of a computer-aided design software for it to be enhanced with field data analyses, as opposed to a solution where it would not be known which design decisions are important, i.e. for which design decisions the analysis of field data is important. Interestingly, the present invention has a very limited impact on development as only a limited number of modifications of the CAD software will be needed to link contexts of use to variables in incident data. These modifications only need to be made on the contexts of use associated with setting the value of a variable identified as important. These modifications are costly, especially as software evolves and contexts of use change, rules that map contexts to important variables need to be changed accordingly. In addition, the present invention has a small impact on execution as only a limited number of analyses will be carried out as a consequence, i.e. analysis will only be triggered for contexts of use linked to important variables, thus limiting the disruption to the designer. Skipping unimportant analyses results in lower latency when completing a design action and before moving on to the next, and therefore a more fluid experience for the designer.

The invention claimed is:

1. A computer-implemented method for determining new occurrences of an event of a physical system to be manufactured in the course of designing a model of the physical on a Computer-Aided Design (CAD) system, the event being a cause of an incident of the physical system, the method comprising:

- obtaining a first set and a third set of past events of the physical system, each past event comprising several attributes, at least one of the several attributes being a structured attribute and at least one of the several attributes being an unstructured attribute, each attribute being a symbol associated with data, the symbol characterizing a parameter of the physical system, the data associated with at least one attribute having been measured by a probe;
- training a context sensitive auto-encoder with the third set of past events, the context sensitive auto-encoder being trained to take as input a vectorized event and to provide as output a signature of the event, the signature of the event being a compression of the event that contains as much as possible of the information necessary to reproduce the event;
- obtaining a signature for each past event of the first set by:
  - vectorizing each past event, the vectorizing comprising converting unstructured attributes into a number of numerical attributes; and
  - applying the trained context sensitive auto-encoder to each vectorized past event;
- obtaining a new event comprising several attributes, the new event being a cause of an incident of the physical system, data associated with at least one attribute of the new event having been measured by a probe;
- computing a signature of the new event by:
  - vectorizing the new event; and
  - applying the trained context sensitive auto-encoder to the vectorized new event;
- computing a similarity measure between the signature of the new event and each signature of each past event of the first set;
- determining a plurality of past events closest to the new event, the plurality of past events having the highest similarity measures, the plurality of past events thereby forming a second set of past events, the number of the plurality of past events closest to the new event being predefined by a user;
- computing a score of relevance for each structured attribute of each of the events of the second set, the computing comprising, for each structured attribute:
  - obtaining a distribution of values of the structured attribute on the second set;
  - obtaining a distribution of values of the structured attribute on the first set; and
  - comparing the distributions of values; and
- generating a set of attributes by selecting the structured attributes of each of the events of the second set having the greater scores of relevance.

2. The computer-implemented method of claim 1, wherein the attributes of the second set for which the scores of relevance are computed are present in each event in the first set.

3. The computer-implemented method of claim 2, wherein the score of relevance of an attribute is computed by comparing distribution probabilities of values of the attribute on the second set with distribution probabilities of values of the attribute on the first set.

4. The computer-implemented method of claim 1, wherein a similarity metric used for determining the past events closest to the new event is one among:

- cosine similarity;
- Euclidian distance; and
- inverse Euclidian distance.

5. The computer-implemented method of claim 1, further comprising, after forming a second set of past events:

- computing at least one subset of past events of the second set; and
- wherein computing the score of relevance further includes: computing the score of relevance for each attribute of in the at least one subset of past events of the second set.

6. The computer-implemented method of claim 1, wherein the past events of the first set and the new event are described by the same attributes.

7. The computer-implemented method of claim 1, wherein the new event and the signature of the new event are stored with the past events and the signatures of the past events thereby becoming a past event.

8. A non-transitory computer readable medium having stored thereon a computer program comprising instructions for performing a method for determining new occurrences of an event of a physical system to be manufactured in the course of designing a model of the physical system on a Computer-Aided Design (CAD) system, the event being a cause of an incident of the physical system, the method comprising:

obtaining a first set and a third set of past events of the physical system, each past event comprising several attributes, at least one of the several attributes being a structured attribute and at least one of the several attributes being an unstructured attribute, each attribute being a symbol associated with data, the symbol characterizing a parameter of the physical system, the data associated with at least one attribute having been measured by a probe;

training a context sensitive auto-encoder with the third set of past events, the context sensitive auto-encoder being trained to take as input a vectorized event and to provide as output a signature of the event, the signature of the event being a compression of the event that contains as much as possible of the information necessary to reproduce the event;

obtaining a signature for each past event of the first set by:

vectorizing each past event, the vectorizing comprising converting unstructured attributes into a number of numerical attributes; and applying the trained context sensitive auto-encoder to each vectorized past event;

obtaining a new event comprising several attributes, the new event being a cause of an incident of the physical system, data associated with at least one attribute of the new event having been measured by a probe;

computing a signature of the new event by:

vectorizing the new event; and applying the trained context sensitive auto-encoder to the vectorized new event;

computing a similarity measure between the signature of the new event and each signature of each past event of the first set;

determining a plurality of past events closest to the new event, the plurality of past events having the highest similarity measures, the plurality of past events thereby forming a second set of past events, the number of the plurality of past events closest to the new event being predefined by a user;

computing a score of relevance for each structured attribute of each of the events of the second set, the computing comprising, for each structured attribute:

obtaining a distribution of values of the structured attribute on the second set;

obtaining a distribution of values of the structured attribute on the first set; and comparing the distributions of values; and generating a set of attributes by selecting the structured attributes of each of the events of the second set having the greater scores of relevance.

9. A system comprising:

a processor coupled to a memory, the memory having recorded thereon a computer program for determining new occurrences of an event of a physical system to be manufactured in the course of designing a model of the physical system on a Computer-Aided Design (CAD) system, the event being a cause of an incident of the physical system, that when executed by the processor causes the processor to be configured to:

obtain a first set and a third set of past events of the physical system, each past event comprising several attributes, at least one of the several attributes being a structured attribute and at least one of the several attributes being an unstructured attribute, each attribute being a symbol associated with data, the symbol characterizing a parameter of the physical system, the data associated with at least one attribute having been measured by a probe;

train a context sensitive auto-encoder with the third set of past events, the context sensitive auto-encoder being trained to take as input a vectorized event and to provide as output a signature of the event, the signature of the event being a compression of the event that contains as much as possible of the information necessary to reproduce the event;

obtain a signature for each past event of the first set by the processor being configured to:

vectorize each past event, the vectorizing comprising converting unstructured attributes into a number of numerical attributes; and apply the trained context sensitive auto-encoder to each vectorized past event;

obtain a new event comprising several attributes, the new event being a cause of an incident of the physical system, data associated with at least one attribute of the new event having been measured by a probe;

compute a signature of the new event by the processor being configured to:

vectorize the new event, and apply the trained context sensitive auto-encoder to the vectorized new event;

compute a similarity measure between the signature of the new event and each signature of each past event of the first set;

determine a plurality of past events closest to the new event, the plurality of past events having the highest similarity measures, the plurality of past events thereby forming a second set of past events, the number of the plurality of past events closest to the new event being predefined by a user;

compute a score of relevance for each structured attribute of each of the events of the second set, the computing comprising, for each structured attribute, by the processor:

obtain a distribution of values of the structured attribute on the second set;

obtain a distribution of values of the structured attribute on the first set; and comparing the distributions of values;

generate a set of attributes by selecting the structured attributes of each of the events of the second set having the greater scores of relevance.

10. The computer-implemented method of claim 2, wherein a similarity metric used for determining the past events closest to the new event is one among:

cosine similarity;

Euclidian distance; and inverse Euclidian distance.

11. The computer-implemented method of claim 3, wherein a similarity metric used for determining the past events closest to the new event is one among:

cosine similarity;

Euclidian distance; and inverse Euclidian distance.

12. The computer implemented method of claim 1, wherein the comparing of the distributions of values comprises a two-sample Kolmogorov Smirnov test.

13. The computer implemented method of claim 1, further comprising:

suggesting to a user a value of at least one of the selected structured attributes of each of the past events that are characteristic of a number of incidents, the suggested value minimizing the chances of an occurrence of the incident associated to the new event; and selecting, by the user, the suggested value, thereby reducing the defects in the lifetime of the physical system to be manufactured.

* * * * *